(12) United States Patent
Ulrich et al.

(10) Patent No.: US 8,627,718 B2
(45) Date of Patent: Jan. 14, 2014

(54) SENSOR ARRANGEMENT FOR DETERMINING A TANK FILL LEVEL, AND METHOD FOR PRODUCING IT

(75) Inventors: Markus Ulrich, Rudersberg (DE); Vlatko Babic, Cologne (DE); Guenther Krenz, Steinheim (DE); Rainer Haeberer, Bretten (DE); Wolf-Ingo Ratzel, Stuttgart (DE); Bruno Hezel, Stuttgart (DE); Michael Gerlach, Marbach A.N. (DE); Vaclav Straus, Ceske Budejovice (CS)

(73) Assignee: Robert Bosch GmbH, Stuttgart (DE)

( * ) Notice: Subject to any disclaimer, the term of this patent is extended or adjusted under 35 U.S.C. 154(b) by 535 days.

(21) Appl. No.: 12/744,438

(22) PCT Filed: Oct. 31, 2008

(86) PCT No.: PCT/EP2008/064827
§ 371 (c)(1),
(2), (4) Date: Oct. 4, 2010

(87) PCT Pub. No.: WO2009/065720
PCT Pub. Date: May 28, 2009

(65) Prior Publication Data
US 2011/0011178 A1 Jan. 20, 2011

(30) Foreign Application Priority Data
Nov. 23, 2007 (DE) .......................... 10 2007 056 544

(51) Int. Cl.
*G01F 23/00* (2006.01)
(52) U.S. Cl.
USPC .......................................................... 73/292

(58) Field of Classification Search
USPC ...... 73/292, 290 R, 304 C, 304 R; 427/421.1, 427/427.4
See application file for complete search history.

(56) References Cited

U.S. PATENT DOCUMENTS

| 3,207,629 A | | 9/1965 | Beckman |
| 3,363,466 A | | 1/1968 | Guidi |
| 4,056,978 A | * | 11/1977 | Zimmermann ............. 73/304 R |
| 4,182,363 A | | 1/1980 | Fuller |

(Continued)

FOREIGN PATENT DOCUMENTS

| DE | 1548883 A1 | 7/1969 |
| DE | 2063103 A1 | 6/1972 |

(Continued)

OTHER PUBLICATIONS

Machine Translation of Mannesmann et al, EP 1037028 A1, Sep. 20, 2000, translated Oct. 2012.*

*Primary Examiner* — Hezron E Williams
*Assistant Examiner* — David Z Huang
(74) *Attorney, Agent, or Firm* — Michael Best & Friedrich LLP

(57) ABSTRACT

The invention relates to a sensor arrangement for determining a tank fill level of a liquid, especially a reducing agent for removing nitrogen from the exhaust gases of an internal combustion engine, which liquid is contained in a tank, at least two electrically conductive measuring electrodes being at least partially embedded in a carrier that is produced of an electrically non-conductive material. The sensor arrangement includes a temperature sensor, especially a resistor with negative temperature coefficient being used as a temperature sensor, which is integrated into the carrier.

20 Claims, 5 Drawing Sheets

(56) References Cited

U.S. PATENT DOCUMENTS

| | | | |
|---|---|---|---|
| 4,902,962 A * | 2/1990 | Ishikawa | 324/690 |
| 5,178,009 A | 1/1993 | Arekapudi et al. | |
| 5,254,807 A * | 10/1993 | Pfander et al. | 174/560 |
| 5,272,921 A * | 12/1993 | Foller et al. | 73/304 R |
| 5,669,263 A * | 9/1997 | Borchers et al. | 73/304 R |
| 5,789,920 A * | 8/1998 | Gass | 324/260 |
| 6,063,350 A | 5/2000 | Tarabulski et al. | |
| 6,202,486 B1 | 3/2001 | Kemp | |
| 6,334,361 B1 * | 1/2002 | De Volder et al. | 73/431 |
| 7,337,662 B2 * | 3/2008 | Sato et al. | 73/304 C |
| 7,992,437 B2 * | 8/2011 | Tshishiku | 73/431 |
| 2005/0247125 A1 * | 11/2005 | Williams et al. | 73/304 C |
| 2006/0196263 A1 * | 9/2006 | Stahlmann et al. | 73/304 R |

FOREIGN PATENT DOCUMENTS

| | | |
|---|---|---|
| DE | 2112121 A1 | 9/1972 |
| EP | 1037028 A1 | 9/2000 |
| NL | 1026654 C1 | 1/2006 |
| WO | 0019173 A2 | 4/2000 |
| WO | 03052357 | 6/2003 |

\* cited by examiner

SENSOR ARRANGEMENT FOR DETERMINING A TANK FILL LEVEL, AND METHOD FOR PRODUCING IT

CROSS-REFERNECE TO RELATED APPLICATION

This application is a 35 USC 371 application of PCT/EP2008/064827 filed on Oct. 31, 2008.

BACKGROUND OF THE INVENTION

1. Field of the Invention

The invention relates to a sensor arrangement and to a method for producing a sensor arrangement.

2. Description of the Prior Art

In vehicles with an internal combustion engine, because of the increasingly stringent exhaust gas legislation expected in the next few years, the pollutant nitrogen oxide must among other things be reduced to an increased extent. A method that is used for this is the method of selective and catalytic reduction, in which the pollutant nitrogen oxide is reduced to nitrogen and water with the aid of a liquid reducing agent, such as an aqueous urea solution. In that method, the liquid reducing agent is stored in a tank and delivered from a tank to a metering point by means of a pump, via a line. A fill level sensor expediently indicates the fill level of the tank.

From German Patent Disclosure DE 101 62 269, a device for determining the fill level of a liquid is already known, which has measuring electrodes of various lengths injected into plastic.

From U.S. Pat. No. 6,063,350, it is also known to put a temperature sensor and a fill level sensor for a urea tank into contact via a common multiple-pin plug.

ADVANTAGES AND SUMMARY OF THE INVENTION

The sensor arrangement of the invention, and the method for producing such a sensor arrangement has the advantage over the prior art of furnishing compactly disposed means for sensing a plurality of measurement variables that are significant to the operation of a reducing agent tank in particular.

It is especially advantageous to dispose the temperature sensor in the interior of the support, in particular inside a tubular region inside the support, because as a result, a protected disposition of the temperature sensor is made possible in a support that is necessary anyway for the measuring electrodes that serve to measure the fill level.

It is especially advantageous in this respect moreover to provide a spray-coated covering region on the contact side of the measuring electrodes for the fill level and to join it integrally to material that locks the temperature sensor with good thermal conductivity inside the support. As a result, in a simple two-stage production method with a primary spray coating and after that a secondary spray coating, a compact multisensor arrangement that is resistant to the chemical effects of the reducing agent and moreover can react quickly to temperature fluctuations in the tank, is furnished.

BRIEF DESCRIPTION OF THE DRAWINGS

Exemplary embodiment of the invention are shown in the drawings and described in further detail in the ensuing description. In the drawings.

DESCRIPTION OF THE PREFERRED EMBODIMENTS

Figure 1:
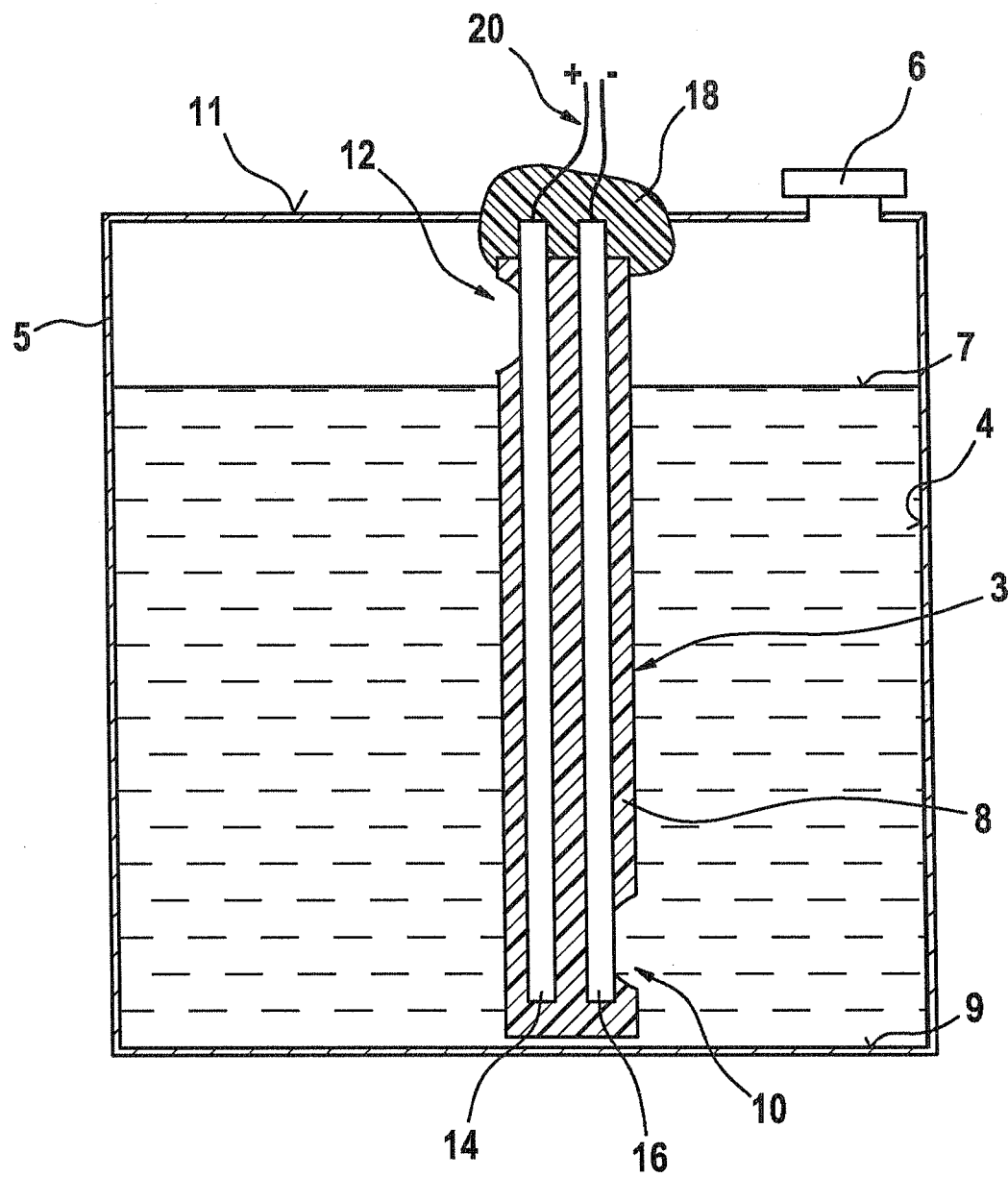
FIG. 1 shows a tank with a fill level sensor.

FIG. 1 shows a tank 5, with a fill level sensor 3 disposed inside the tank that extends, essentially parallel to the lateral tank wall 4, from the bottom 9 of the tank to the highest liquid level 7 attainable in the tank of an aqueous urea solution ("Ad Blue"). On the top side of the tank, on which a closable opening 6 of the tank is disposed, the fill level sensor 3 is held in a vertical position by means of a covering region 18 joined to the top side of the tank. The fill level sensor 3 has a first measuring electrode 14, embodied as a metal pin, and a second measuring electrode 16, also embodied as a metal pin. Both measuring electrodes are embedded in a support 8, which surrounds them completely with the exception of one measurement window each. The first measuring electrode 14 can enter into electrical contact with the liquid located in the tank via an upper measurement window 12, which is formed by a suitable recess in the support 8, if the level 7 of this liquid exceeds a certain maximum value. The second measuring electrode 16, hereinafter also called the reference electrode, has a lower measurement window 10, which is disposed near the bottom of the tank. On the side toward the tank top side 11, the two measuring electrodes are joined by means of an electrical contact 20, and at this point, the measuring electrodes protrude out of the support 8, but, together with the part of the electrical contact 20 toward the measuring electrodes, they are surrounded by the covering region 18.

The fill level sensor 3 makes discontinuous fill level measurement possible. If both measuring electrodes are in electrical contact with the liquid located in the tank, then, because both measurement windows are plunging at least partway into the liquid, when electrical voltage is applied to the electrical contact 20 via the liquid and the measuring electrodes, an electric current can flow. A flowing electric current is the signal that the tank is full. If the liquid is located between the two measurement windows 12 and 10 of the two metal pins of equal length injected into the plastic housing, then the current circuit is interrupted; that is, no current flows, which means that the tank is not full. The same is true if the liquid level drops below the measurement window 10. The covering region 18, which protects the electrical contact from the effects of liquid and keeps the fill level sensor in its vertical position, is embodied here as secondary spray coating of plastic on the support 8 that is embodied as a primary spray coating; this ensures safe operation of the fill level sensor even when chemically aggressive materials, such as an aqueous urea solution, are employed.

Figure 2:
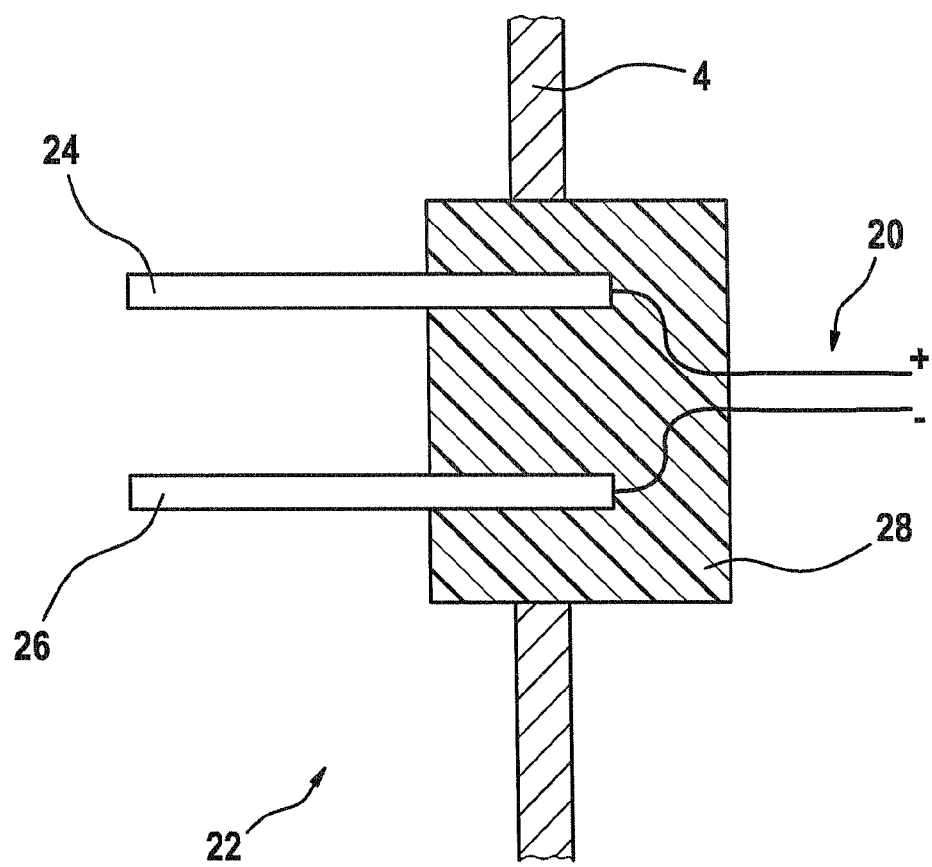
FIG. 2 shows a second fill level sensor.

FIG. 2 shows a variant 22 of a fill level sensor for radial mounting in the tank. Here, a support element 28 is integrated in liquid-tight fashion with a vertical tank wall 4. The support element keeps two measuring pins parallel to one another in a horizontal position. The first measuring pin 24 is disposed above the second measuring pin 26. An electrical contact 20 is extended out of the support element 28 for contacting the fill level sensor outside the tank.

Similarly to the disposition of FIG. 1, a current circuit between the two measuring pins 24 and 26 closes as soon as both measuring pins, because of a sufficiently high fill level in the tank, come into contact with the liquid located in the tank.

Figure 3:
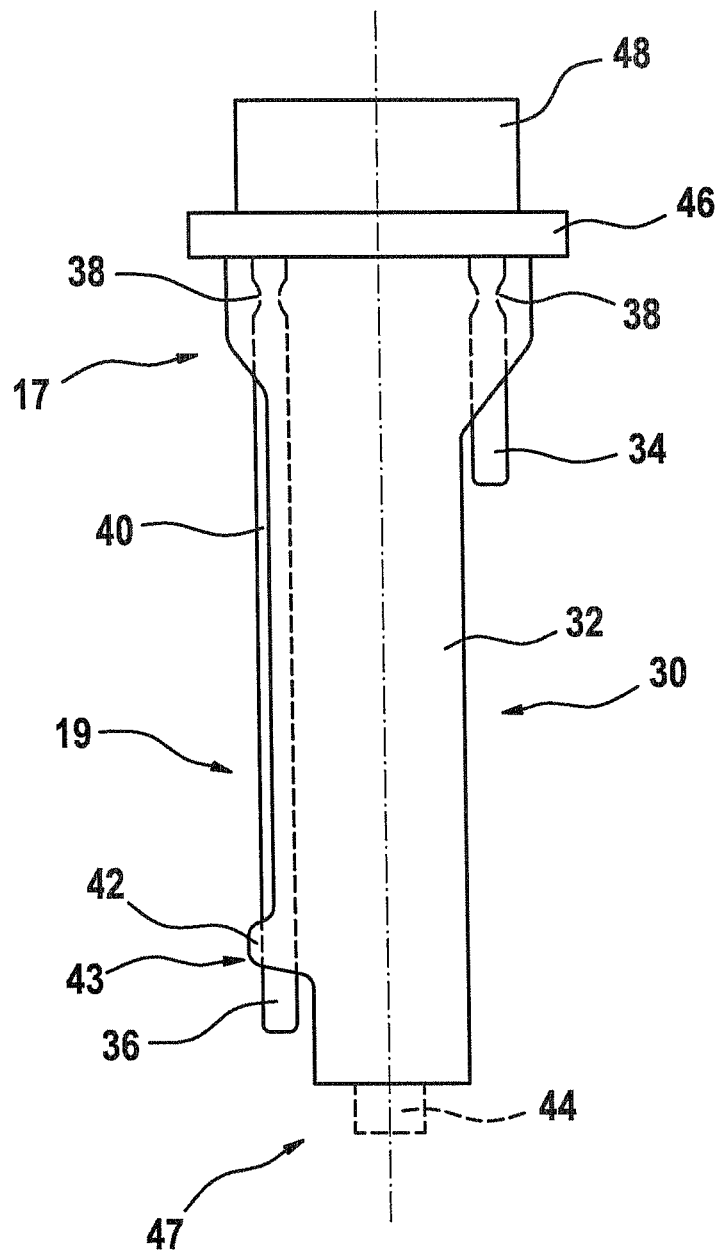
FIG. 3 shows a third fill level sensor.

FIG. 3 shows a fill level sensor or sensor arrangement 30 for determining a fill level of AdBlue in a reducing agent tank. It has a first measuring electrode 34 and a parallel, longer second measuring electrode 36, which are embodied as measuring pins, with the longer electrode acting as a reference electrode. The two measuring electrodes are retained by a support 32, which is produced by partial spray-coating of the electrodes with plastic. On the side hereinafter called the locking side 17, both measuring electrodes have a locking means, embodied as a circumferential groove 38, which is surrounded entirely by the (primary) plastic spray-coated region or support 32. In a similar way to the sensor of FIG. 1, the sensor arrangement 30 is arranged for being built into a tank or part of a tank in its interior, vertically parallel to a lateral tank wall. The locking side 17 of the measuring electrodes is then located near the top side 11 of the tank (FIG. 1). The circumferential grooves 38 are located at approximately the same level, while the two measuring electrodes protrude to different depths into the tank; the longer, second measuring electrode 36 here serves as a reference electrode. The shorter measuring electrode 34 is held only on its half oriented toward the locking side 17 by the support 32, while the half facing away from the locking side 17 protrudes freely downward so that it can be wetted by liquid in this region over its entire circumference, given a suitable liquid level in the tank. The reference electrode 36 is not only spray-coated with plastic in the vicinity of the locking means 38, but in addition is surrounded halfway in a middle region 40 by the primary plastic spray-coated region or support 32. On the side 19 of the reference electrode 36, facing away from the locking side 17, the support 32 has a retention means 42 for partial radial fixation of the reference electrode. This retention means is joined integrally to the support 32 and surrounds the reference electrode completely along its circumference in a manner similar to a shaft bearing. On the far side of the locking side 17, of the middle region 40, and of the retention means 42, the end of the reference electrode protrudes freely downward, similarly to the half of the first measuring electrode that faces away from the locking side. The region 43 of the support 32 forming the retention means 42 can be produced in one operation in the context of a suitably performed spray-coating of the measuring electrodes with plastic. The support 32 furthermore, as a component joined integrally to it, has a closure edge 46, onto which a secondary spray coating of plastic is applied as the covering region 48. This covering region 48, in a manner similar to that in the sensor arrangement of FIG. 1, serves the purpose of liquid-tight covering of the electrical contacts, not identified by reference numeral in FIG. 3, of the measuring electrodes on the top side of a tank. On the underside 47 of the sensor arrangement, which is disposed in the vicinity of the bottom of a tank, a temperature sensor 44 is selectively located, for measuring the temperature of the liquid located in the tank.

To avoid malfunctions and to avoid corrosion in the interior of the sensors for the fill level and the temperature, the measuring elements must be suitably sealed off from the chemically aggressive AdBlue. In this connection, a primary spray coating region or support 32 of the measuring electrodes, embodied as measuring pins, and an adjoining secondary spray coating of plastic at the covering region 48, which forms the sensor head, are provided. This provision, that is, providing a primary and a secondary spray coating, is necessary since the inserted parts or measuring electrodes, or an electrical contact connected to them, cannot be injected in a free-floating fashion. Between the primary spray coating and the secondary spray coating, gaps can occur, which are reinforced to a greater extent upon a temperature change because of the differing coefficients of thermal expansion of the inserted parts of steel (the measuring electrodes) and the surrounding plastic. In continuous operation, gaps can also occur between the measuring pins and the spray-coated plastic region or support 32. The measuring pins or measuring electrodes 34 and 36, produced for instance from special steel, have a considerably lower coefficient of thermal expansion than the plastic support 32. The construction principle of the sensor arrangement of FIG. 3 is directed to this situation. The measuring electrodes are fixed axially firmly in the plastic only in the upper region, that is, on the locking side 17, each by one circumferential groove 38, while the measuring pins in the middle, half-spray-coated region 40, or in the region of the retention means 42 or on the far side thereof, can move axially, especially since the pins on the face end, that is, on the side toward the underside 47 of the sensor arrangement, protrude out of the plastic. This construction ensures a different axial thermal expansion of the measuring pins relative to the plastic support 32.

Alternatively, the sensor arrangement may also have more than two measuring electrodes, which are likewise disposed relative to one another but which have graduated lengths between the length of the shortest electrode 34 and the length of the longest electrode 36, the latter used as the reference electrode. Thus on the basis of the electrical conductivity between the respective measuring pin and the reference electrode 36, it is possible to conclude whether more than one fill level position in the tank has been reached or not. Alternatively, the temperature sensor 44 may also be omitted. In a further alternative embodiment, the reference electrode 36 and the electrodes that are embedded halfway in the support 32 in a middle region 40 can also be covered, on their side toward the tank interior, by a thin plastic film that leaves the expansion behavior of the measuring pins essentially unaffected. Instead of being embodied as a secondary spray coating, the covering region 48 can be embodied as a housing, which is mounted on the closure edge 46 of the support 32.

Figure 4:
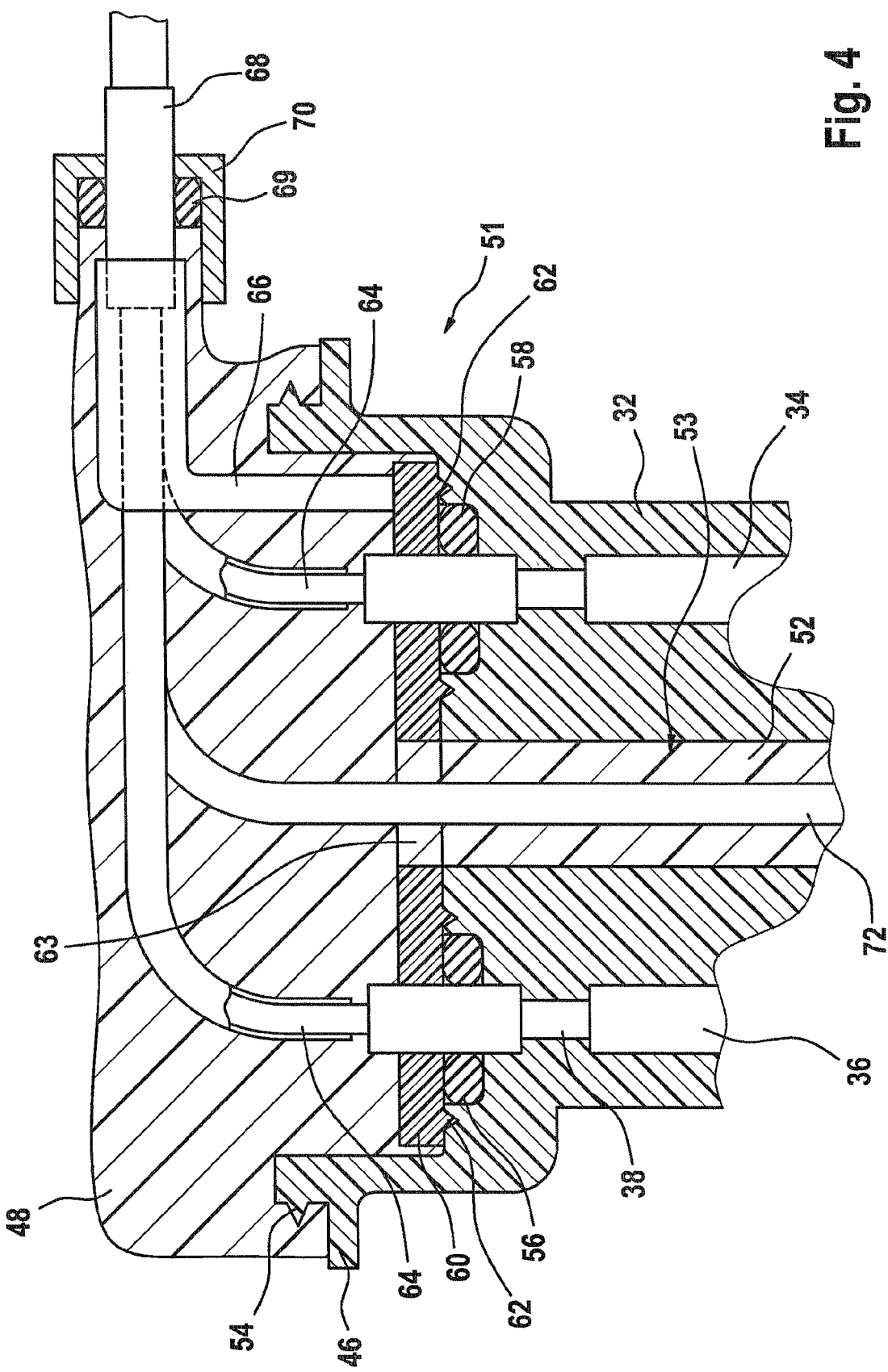
FIG. 4 is a fragmentary view of a sensor arrangement for determining a fill level.

FIG. 4 shows a fragmentary view 51 of a sensor arrangement for determining a fill level. What is shown is the region of the sensor head that does not plunge into the liquid and by way of which the measuring electrodes 34 and 36 are electrically contacted. Components that are the same or similar to those already described above are identified by the same reference numerals and will not be described in detail again. On the far side of the circumferential groove 38, on the side facing away from the tank interior, the measuring electrodes protrude past the support 32. There, they are each connected to a respective electrical contact 64, which, relative to one another, merges with an electrically insulated manner with a common round cable 68. This electric round cable 68 leads to an electric evaluation circuit or an electronic control unit, which may also be embodied as an engine control unit. On the upper end of the support, the measuring electrodes are sealed off by means of sealing elements 56 and 58, respectively, embodied as O-rings. On the side toward the tank interior, the sealing elements are bounded by the support 32, and on the side facing away from the tank interior, they are separated from the remaining structure of the sensor head by means of a separator plate 60 mounted on the support 32. The separator plate 60 has ribs 62, which engage the support 32 and serve the purpose of radial fixation of the separator plate during assembly. The measuring electrodes pass through the separator plate 60 so that they can be in contact, on the side facing away from the circumferential grooves 38, with the electrical contact 64. The separator plate 60 has a central hole 63, through which an electric double line 72, beginning at the electric round cable 68 and shown in simplified form, is extended in the direction of the tank bottom. This double line 72 serves the purpose of electrically contacting a temperature sensor, not identified by reference numeral. Here, the electric double line 72 is located in a tubular region 52, which is filled with the same material 43 that comprises the covering region 48 embodied as a secondary spray coating. The covering region 48 and the tubular region 52 are integrally joined to one another and can be produced in a single suitably designed spray-coating operation. The same material or the same plastic can be used as that comprising the support 32, or alternatively, a different material can be used that has a coefficient of thermal expansion similar to that of the material comprising the support 32. The electrical contacts 64 can be made by soldering, welding, or pressing; the electric round cable 68 is fixed by means of a cable mount 66 that is secured peripherally to the separator plate 60.

Before the secondary spray coating or the production of the covering region 48 is done, the aforementioned O-ring seals 56 and 58 are sealed off from the secondary spray coating by means of the separator plate or mounting plate 60 also already described. By being guided closely in the vicinity of the measuring pins and circumferentially, this mounting plate, caught in the support 32 via the ribs 62, prevents liquid plastic from entering the O-ring space in the production of the covering region 48. The fine ribs 62 reinforce an axial sealing off of the O-ring space. The cable mount 66 ensures that the cable is fixed in its position in the secondary spray coating. In the arrangement in FIG. 4, the closure edge 46 of the support 32 known from FIG. 3 is formed by an encompassing rib on the primary spray coating, and this rib furthermore has a melting edge embodied as a hook 54. The secondary spray coating flows from above over this rib or melting edge. As a result of the shrinkage of the secondary spray coating on cooling during the production process, the secondary spray coating is pressed tautly on the encompassing rib and will thus in terms of force relieve the melting edge, which during the injection operation, as a result of the melting, has created a partial sealing location: The finished primary spray coating is cold, while the secondary spray coating during the spray-coating is initially hot. On cooling down, the secondary spray coating shrinks, and particularly in the region between the hook 54 and the closure edge 46 of the support, it builds up pressure stresses on the primary spray coating. As a result, the melting edge that is responsible for the sealing is relieved in terms of force. The round cable 68, which protrudes out of the secondary spray coating of the covering region 48, is sealed off via a mechanical seal by means of a sealing element 69 of an elastomer material and a tension element 70 fitted over it. The sealing element 69, for instance an O-ring, is a radial seal that is reinforced by an axial force component by means of the fitted-over tension element 70. The tension element 70, embodied for instance as a plastic sleeve, is joined to the secondary spray coating via a plastic weld.

Figure 5:
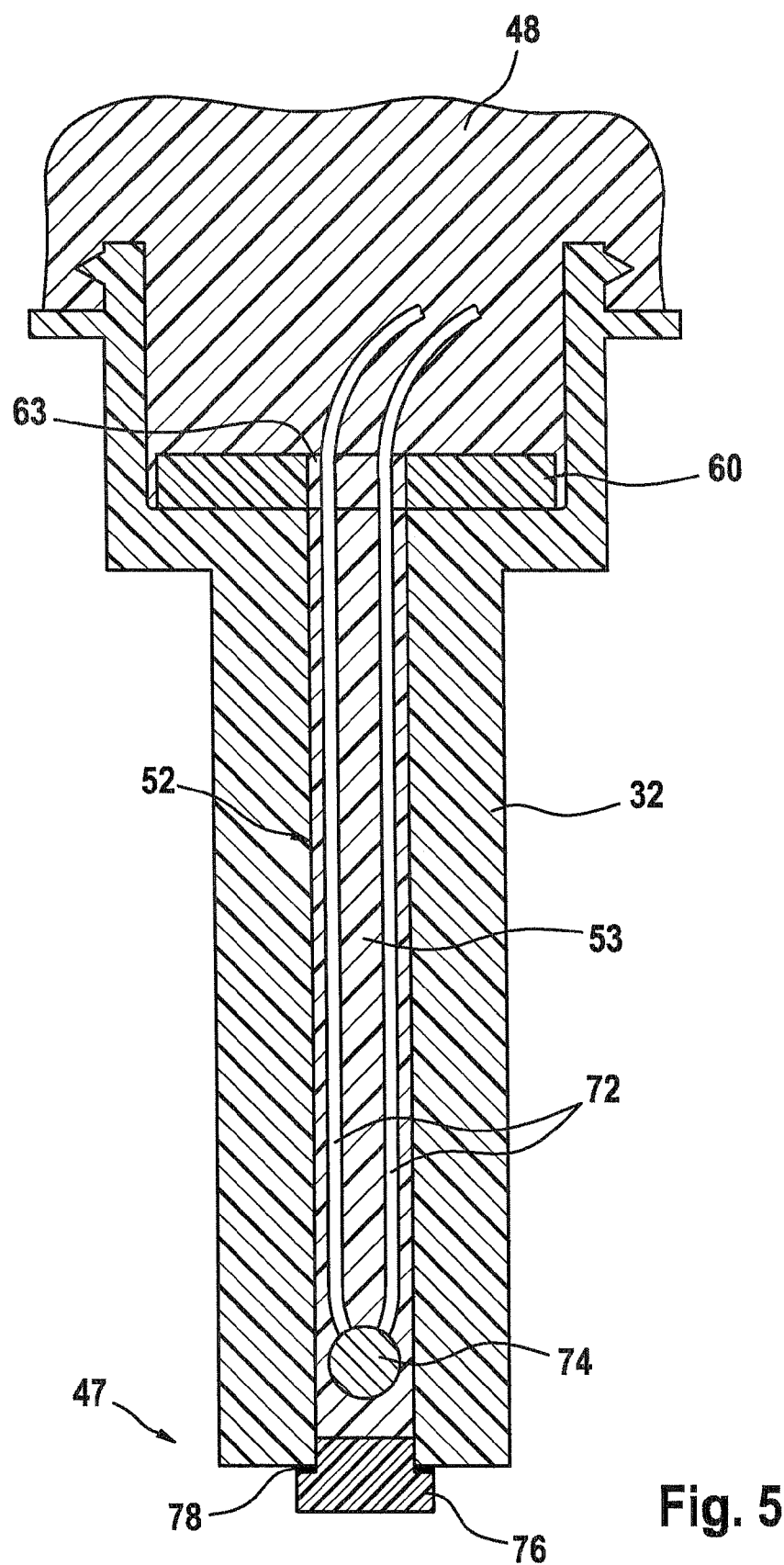
FIG. 5 is a schematic view of a sensor arrangement with an integrated temperature sensor.

FIG. 5 shows a partly schematic view of a fill level sensor with an integrated temperature sensor 74, embodied as an NTC resistor. Details of how the measuring electrodes required for fill level measurement and the electrical contacting of these measuring electrodes are not shown in detail in FIG. 5; it serves to explain the construction and integration of the temperature sensor with the sensor arrangement for determining a fill level. The electric double line 72 already schematically shown in FIG. 4 leads to the underside 47 of the sensor arrangement, where it electrically contacts the NTC resistor, that is, a resistor with a negative temperature coefficient. The tubular region 52 extends here from the covering region 48 to the underside 47 of the sensor arrangement and is essentially completely filled with the material comprising the secondary spray coating. Toward the underside, the tubular region is sealed off from the tank liquid by means of a closure 76, and the closure is joined to the support 32 via a circumferential welded region 78.

The combination of a fill level sensor and a temperature sensor, that is, the disposition of both measuring elements in one housing with a common cable exit, makes a compact construction that is resistant to chemically aggressive materials possible. The temperature should expediently be measured in the vicinity of the bottom of the tank, that is, near or at the level of the lowest still-detectable liquid level. Accordingly, the temperature sensor 74 is disposed approximately at the level of the contact region of the longest measuring electrode, which makes an electrical contact of this measuring electrode with liquid in the tank possible. To that end, the primary spray coating region or support 32 of the fill level sensor contains at the center the tubular region 52 in which the NTC resistor can be placed. The separator plate 60 described above has a central hole 63, through which the cable of the temperature sensor is extended into the covering region. It is expedient for the temperature sensor, as described, to be injected; it can thus detect the direct temperature in the vicinity of the bottom of the tank quickly and correctly; if it were disposed in an only air-filled tube inside the support 32, on the one hand it would measure only the temperature in the air tube and on the other it would react only in very delayed fashion to temperature changes in the tank. Fast detection of the temperature in the tank, however, is desirable so that by suitable heating of the tank liquid, freezing can be prevented, or a heater can be switched off in good time to prevent premature aging of the liquid in the tank. Here, during the production process, the secondary spray coating passes through the opening of the mounting plate into the continuous tube 52 and thus surrounds the temperature sensor. Finally, this tube is closed by a welding operation with a capsule or closure 76. It is thus ensure that the temperature sensor can operate, fully sealed off from the Ad Blue, in the lower region of the fill level sensor.

The foregoing relates to the preferred exemplary embodiments of the invention, it being understood that others variants and embodiments thereof are possible with the spirit and scope of the invention, the latter being defined by the appended claims.

The invention claimed is:

1. A sensor arrangement for determining a fill level of a liquid contained in a tank, the sensor arrangement comprising:
   at least two electrically conductive measuring electrodes embedded at least partly in a support of electrically nonconductive material, the support including a hook;
   a temperature sensor, having a negative temperature coefficient, integrated with the support;
   a covering region hardened around the hook to secure the covering region to the support; and
   a separator plate disposed between the covering region and the support.

2. The sensor arrangement as defined by claim 1, wherein the temperature sensor is disposed in an interior of the support.

3. The sensor arrangement as defined by claim 2, wherein the temperature sensor is located in a tubular region of the support.

4. The sensor arrangement as defined by claim 3, wherein the measuring electrodes are disposed essentially parallel to one another, and the tubular region extends parallel to the measuring electrodes.

5. The sensor arrangement as defined by claim 4, wherein the tubular region is integrally joined to the covering region.

6. The sensor arrangement as defined by claim 3, wherein the tubular region is integrally joined to the covering region.

7. The sensor arrangement as defined by claim 1, wherein one end of the at least two measuring electrodes are sealed off from influences of liquid by the covering region.

8. The sensor arrangement as defined by claim 1, further including sealing elements disposed between the separator plate and the support that seal off the measuring electrodes.

9. The sensor arrangement as defined by claim 1, wherein the support is a first spray-coated support, and wherein the temperature sensor is integrated into the support in a second spray coating.

10. The sensor arrangement as defined by claim 1, wherein the temperature sensor is disposed on a side of the measuring electrodes that is intended for placement near a bottom of the tank.

11. The sensor arrangement as defined by claim 1, wherein the support is made of plastic.

12. The sensor arrangement as defined by claim 1, wherein the support is produced by spray-coating the measuring electrodes with the electrically nonconductive material.

13. A method for producing a sensor arrangement as defined by claim 1, comprising the steps of:
at least partially embedding two measuring electrodes with a first spray-coating to form a support;
integrating a temperature sensor, having a negative temperature coefficient, with the support by embedding the temperature sensor with a second spray-coating; and
forming a hardened covering region with the second spray-coating, the covering region extending over a hook on the support and securing the covering region to the support.

14. The method of claim 13, wherein the step of forming the covering region includes directing a flow of the second spray-coating over the hook, and cooling the flow of the second spray-coating.

15. The method of claim 14, wherein the support is cooler than the second spray-coating when the flow of second spray-coating is directed over the hook.

16. The method of claim 13, wherein the support includes a closure edge, and wherein the step of forming the covering region includes directing the second spray-coating into an area between the hook and the closure edge.

17. The method of claim 13, wherein the hook forms a melting edge that forms a sealing location between the covering region and the support during the step of forming the covering region.

18. The method of claim 13, wherein both the first and second spray-coatings are non-conductive spray coatings.

19. The method of claim 13, wherein the second spray coating forms a tubular region extending into the support.

20. The method of claim 19, wherein the temperature sensor is embedded in the tubular region.

* * * * *

UNITED STATES PATENT AND TRADEMARK OFFICE
CERTIFICATE OF CORRECTION

PATENT NO.       : 8,627,718 B2                                       Page 1 of 1
APPLICATION NO.  : 12/744438
DATED            : January 14, 2014
INVENTOR(S)      : Ulrich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 668 days.

Signed and Sealed this

Twenty-second Day of September, 2015

Michelle K. Lee
*Director of the United States Patent and Trademark Office*